(12) United States Patent
Deng et al.

(10) Patent No.: US 8,529,804 B2
(45) Date of Patent: Sep. 10, 2013

(54) METHOD FOR MANUFACTURING A MODIFIED OPTICAL FIBER

(71) Applicants: Kung-Li Deng, Princeton, NJ (US); Qing Ye, Los Gatos, CA (US)

(72) Inventors: Kung-Li Deng, Princeton, NJ (US); Qing Ye, Los Gatos, CA (US)

(73) Assignee: Enlighting Inc, Princeton, NJ (US)

( * ) Notice: Subject to any disclaimer, the term of this patent is extended or adjusted under 35 U.S.C. 154(b) by 0 days.

(21) Appl. No.: 13/671,157

(22) Filed: Nov. 7, 2012

(65) Prior Publication Data

US 2013/0062798 A1 Mar. 14, 2013

Related U.S. Application Data

(63) Continuation of application No. 13/019,306, filed on Feb. 1, 2011, now Pat. No. 8,331,750.

(51) Int. Cl.
*B29D 11/00* (2006.01)

(52) U.S. Cl.
USPC .......................................................... 264/1.24

(58) Field of Classification Search
USPC .................................. 385/129, 128; 264/1.24
See application file for complete search history.

(56) References Cited

U.S. PATENT DOCUMENTS

| | | | | |
|---|---|---|---|---|
| 5,995,690 A * | 11/1999 | Kotz et al. | ........................ | 385/25 |
| 6,272,275 B1 * | 8/2001 | Cortright et al. | ............... | 385/129 |
| 6,284,437 B1 * | 9/2001 | Kashyap | ....................... | 430/321 |
| 6,535,667 B1 * | 3/2003 | Gozum et al. | ................... | 385/31 |
| 7,155,103 B2 * | 12/2006 | Higuchi et al. | ................ | 385/132 |
| 7,412,139 B2 * | 8/2008 | Kingsford et al. | ............. | 385/100 |
| 2011/0212411 A1 * | 9/2011 | Sinofsky | ......................... | 433/29 |

* cited by examiner

*Primary Examiner* — Charlie Peng

(57) ABSTRACT

A modified optical fiber comprises one Surface Light Field Emulation (s-LiFE) segment, comprising a core; a cladding; and multiple controlled nanoscale diffusion centers to emit light through the side of the optical fibers. Optionally, the modified optical fiber has a coating. The nanoscale diffusion centers are physical geometric patterns or composition patterns in the cladding or the coating. The s-LiFE optical fiber is a member of an illumination system further comprising a light source. The method of making of said s-LiFE optical fiber comprises a fiber spooning step.

19 Claims, 11 Drawing Sheets ns-804 B2

METHOD FOR MANUFACTURING A MODIFIED OPTICAL FIBER

CROSS-REFERENCE

This is a divisional application of co-pending U.S. patent application Ser. No. 13/019,306, filed Feb. 1, 2011. The subject matter as set forth in each one of the following US utility patent applications is incorporated herein by reference in its entirety:

Ser. No. 61/300,437 filed Feb. 1, 2010; and
Ser. No. 61/333,406 filed May 11, 2010.

BACKGROUND

1. Field of Invention

The present invention relates generally to optical fibers with side emissive properties. More particularly, the examples disclosed herein are directed to optical fibers having Surface Light Field Emulation (s-LiFE) properties (herein after "s-LiFE optical fibers"), systems using them and method of making the same. The s-LiFE optical fibers are used for displays or general illuminations and to be produced at a low cost.

2. Discussion of Related Art

Optical fibers are used primarily in the telecommunication industry. An optical fiber typically comprises a core and cladding. The cladding usually has a slightly lower refractive index than that of the core. Light typically strictly propagates within the optical fiber core through total internal reflection and does not leak out if there are no defects or impurities in the material and structure.

Although most optical fibers have been manufactured to meet telecommunication requirements, i.e. to achieve essentially no light leaking out, i.e. side emission, through its propagation pathway, some side-emitting optical fibers have also made as a component in an illumination system. These side-emitting optical fibers are made by employing modification techniques to encourage the light to exit the optical fiber through its length.

U.S. Pat. No. 7,137,416 teaches a method that includes weaving optical fibers as warps or weft threads into a piece of fabric. In another words, the optical fibers are subjected to some degree of bending (generally known as "micro-bending") in the fabric to give out light. U.S. Pat. Nos. 6,206,533 and 4,234,907 teach a surface damaging technique applying a single scratch or notch at intervals along the optical fiber length. French Pat. No. 2,626,381 explored the extreme of removing part of the optical fiber cladding layer in order to emit light.

U.S. Pat. No. 7,433,565 teaches addition of diffuser particles to the core. The diffuser particles are distributed to scatter light being transmitted along the core so that some of the scattered light exits the sides of the optical fiber. U.S. Pat. No. 5,631,994 also disclosed the technique of using fluorescent dopants in the optical fibers to achieve side emitting.

The micro-bending, surface damaging techniques and using diffuser particles and fluorescent dyes can only achieve uncontrolled and interrupted emission through the optical fiber length.

U.S. Pat. No. 5,631,994 teaches a light extraction overlay which is formed from an optically transparent substrate, fabricated by conventional manufacturing processes, such as a molding process. An adhesive backing is applied to the overlay so that it can adhere to the fiber core. The process itself requires some precision to achieve the intended property. More importantly, the overlay creates two extra interfaces, the fiber/adhesive interface and the adhesive/substrate interface. The additional interfaces will cause undesirable scattering or reflection.

U.S. Pat. No. 7,213,947 teaches a technique using a reflector to modify the interface between the core and the cladding so that the light striking the interface between the cladding and the core may be transmitted out through the cladding, rather than reflected back into the core, appearing as illumination. The reflector is carefully engineered and in the size of micrometers.

The light extraction overlay and reflector technique are able to achieve carefully engineered emission but the processes are complicated.

Our Surface Light Field Emulation (s-LiFE) optical fiber disclosed herein allows the light to come out in a more controlled fashion, which offers significant design flexibility for designers to tailor emission position, intensity and color for different applications. The present invention can be used to scientifically engineer light emitting from an optical fiber by combining and balancing light scattering, refraction, reflection and filtering to realize individual visual effects. Designers can choose to make the emission appearance to look more like a diamond or precious metals such as silver or gold, or some combination as they prefer.

In addition, the present invention uses dimensions in the nanometers range, which offers minimal intrusion to the physical structure of the optical fiber. The current invention is much smaller in dimension compared to the above-mentioned inventions. Structure deformation caused by micro-bending is in the size of micrometers and reflectors in the optical fiber are often in micrometer to milimeter range. The bigger the size of deformations, the more the physical strength and mechanical flexibility of the optical fiber is compromised. The present invention uses structure intrusions ten to hundred times smaller, thus providing better structural integrity of the optical fiber. Given the advantages, the present invention has broader applications, more flexibility and better adaptability in incorporating into various illumination systems.

SUMMARY OF INVENTION

The present invention provides an optical fiber comprising a Surface Light Field Emulation (s-LiFE) segment. The said Surface Light Field Emulation (s-LiFE) segment comprises at least a core, cladding, and multiple controlled nanoscale diffusion centers. The said nanoscale diffusion centers are capable of changing the light propagation pathway, redirecting and enhancing light coupling from the optical fiber to the exterior environment, and the said light coupling is engineered to provide higher precision control of light emitting properties, such as emission position, intensity, color (wavelength) and visual effects, than that caused by micro-bending, structure deformation and intrinsic impurities in the optical fiber, and without the said nanoscale diffusion centers, the light is strictly confined in the core.

The said nanoscale diffusion centers, nanometer-sized, not only allow the light to couple to the exterior environment through the cladding, but also provide means to alter light coupling properties such as intensity and color (wavelength) through micrometer to milimeter range. As a result, the visual effect from the said light coupling can be specifically tailored and precisely controlled.

In one aspect of the invention, a first embodiment, the nanoscale diffusion centers comprise nanoscale geometric patterns in the cladding, the said geometric patterns result in modulation of the refractive index in the cladding. The nanoscale geometric patterns include physical patterns (i.e. nanosized structures which can be characterized by surface profilometry methods) and composition patterns caused by refractive index differences of the materials employed in the cladding.

The said physical patterns are composed of a plurality of random oriented periodic nanostructures and each nanostructure comprises a peak and a valley. The distance between one peak and its nearest neighboring peak in the periodic nanostructures is in the range of 30 nm-1200 nanometers, preferably 30-200 nanometers. The periodic nanostructures have an average roughness of 8-600 nanometers, preferably 25-100 nanometers.

The said composition patterns are composed of structural moieties having high refractive indexes (i.e. "peaks") and materials having low refractive indexes (i.e. "valleys"), with at least some refractive index differences between the "peaks" and "valleys" greater than 0.03-0.05. The composition patterns have no defined geometry and location. In a first embodiment, the said composition patterns are formed by using monomers (A, B) with different refractive indexes, wherein said monomers after being polymerized to make the cladding, resulting in a mixture of compositions (AA, AB, BB etc) with different local refractive indexes. In a second embodiment, the said composition patterns are created by polymers having more than one phase, and the different phases have different refractive indexes, such as liquid crystal polymers. In a third embodiment, the said composition patterns are created by monomers or other small molecules diffused into an already-formed polymer cladding, wherein the said monomers or small molecules have 3-4% more or less refractive index values than that of the existing cladding.

Further, in the aforementioned first embodiment, the specific location of the "peaks" and "valleys" cannot be accurately controlled, however the refractive indexes of "peaks" and "valleys" or the difference between the "peaks" and "valleys" can be modulated. In one example, changing the overall degree of polymerization or cross-linking density of polymer, the composition ratio between un-reacted monomers, partially reacted monomers and completely converted monomers are changed and the corresponding refractive indexes are also changed. In another example, some monomers with relative high or low refractive index (Rf) within the starting monomers can be preferentially polymerized, by using any number of methods including attaching monomers to more reactive functionalities, selectively UV radiating with a preferred wavelength, or adopting a stepwise temperature profile. As a result, the cladding composition is altered and so are the respective refractive indexes.

In accordance with the present invention, the nanoscale geometric patterns are located in the cladding of the said Surface Light Field Emulation (s-LiFE) segment of the optical fiber. The cladding has a thickness of at least 1000 nanometers. In one example of the invention, periodic nanostructures or parts of the peak or valley are at the cladding/environment interface. In another example, periodic nanostructures or parts of the peak or valley are only in the thickness of the cladding, between the cladding/air and core/cladding interfaces. In a more preferred example, the periodic nanostructures or parts of peak or valley structures are at the core/cladding interface.

In a second embodiment of the invention, the nanoscale diffusion centers further comprise dye molecules in the cladding. The dye molecules include, but are not limited to, organic fluorescent dyes, phosphorescent dyes and quantum dots.

The dye molecules are evenly dispersed in the cladding of the said Surface Light Field Emulation (s-LiFE) segment of the optical fiber. Different dye molecules are selected in accordance with their absorption/emission spectra and their quantum efficiencies, in order to meet the desired color and efficiency requirement of the Surface Light Field Emulation (s-LiFE™) optical fiber. And the distance between the dye molecules, and their interactions with other nanoscale diffusion centers are optimized to achieve different desired emission patterns and effects. In some examples, the dye molecules are doped along a 1 mm segment of the optical fiber, in another example the dye molecules are doped sporadically along a longer length. Dye molecules can be incorporated into the original monomer mixture of the plastic optical fiber preform. The final distribution of dye molecules along the optical fiber will depend on the concentration ratio between host (optical fiber material) and dopant (dye) molecules.

Fluorescent dye molecules chosen from a group comprising PBD, Bis MSB, 3-3'-diethyloxycarbocyanine-iodide, cresyl violet 670 perchlorate, Coumarin 7, Coumarin 314, 1,8-Diphenyl-1,3,5,7-octatetrene, Sulforhodamine 101, Sulforhodamine 640. Anthraquinone, perinone, or xanthene laser dye belongs in one of the Cyanine, Pyrromethene, Xanthene, Coumarin, Oxazole and Conjugated Hydrocarbons families of laser dyes. The preferred groups of laser dyes are the Cyanine (red to IR), Pyrromethene (yellow to red), Xanthene (600 nm), Coumarin (blue-green), Oxazole (400 nm), and Conjugated Hydrocarbon (UV) families.

In a third embodiment of the invention, the nanoscale diffusion centers further comprise nanoparticles in the cladding of the said Surface Light Field Emulation (s-LiFE™) segment of the optical fiber. The nanoparticles include fluorescent and phosphorescent dye labeled polymer beads, like Chromeon-marked Polyacrylnitrile (PAN Beads-Biotin, PAN Beads-Streptavidin, PAN Beads carboxylated) and PD Beads (PD-Chromeon 470, PD Beads carboxylated, PD Beads Streptavidin), and inorganic nanoparticles like polymer bound metal oxides ($Fe_2O_3$, $TiO_2$, $ZnO$, $BaSO_4$ etc). The nanoparticles have average diameters less than 50 nm. The dye bound polymer nanoparticles absorb light fall within their respective absorption spectra, re-emit in different wavelengths in different directions. Both organic and inorganic nanoparticles scatter and re-direct incident lights into different directions, which often offers higher local brightness in side emission than other techniques.

Nanoparticles can be homogeneously suspended with monomers, which will form the optical fiber core, and/or cladding. Then through a regular optical fiber pulling process, the monomers will crosslink by either thermal or UV cure to form an optical fiber structure. Nanoparticles will co-exist in the cross-linked polymers as a small amount of dopant. The concentration of the nanoparticles is controlled at around 0.5-10 ppm w.r.t the total weight of monomers to form the optical fiber, whereas 1 ppm is a preferred concentration.

In a fourth embodiment of the invention, the nanoscale diffusion centers further comprise high refractive index organic materials in the cladding of the said Surface Light Field Emulation (s-LiFE™) segment of the optical fiber. The said high refractive index organic materials include halogenated materials and aromatic materials, which have higher refractive indexes than that of the cladding material. The local refractive index change in the cladding changes the light distribution between the core and cladding so that more light is re-directed out. The halogenated materials are primarily a halogenated hydrocarbon group having 1 to 19 carbon atoms, with one or more hydrogens being substituted by a chlorine, bromine or iodine atom, whereas bromine and iodine are more preferred than chlorine. Furthermore, the halogenated materials optionally contain aromatic groups such as phenyl and naphthyl groups, with said halogens preferably attached to aromatic carbons. Depending on the refractive index of the cladding, the said aromatic materials with refractive indexes higher than that of the cladding material include, for example, methoxynaphthalene, which has a refractive index of 1.62 and dodecylbenzene, which has a RI of 1.48.

The said high refractive index organic materials are dissolved therein along the length of the Surface Light Field Emulation (s-LiFE™) segment of the optical fiber. In one example, the said high refractive index organic materials are uniformly dissolved through the thickness of the cladding. In another example, the said high refractive index organic materials are dissolved throughout the cladding with a concentration gradient. Halogenated materials are 1-10 wt % of the total weight of the Surface Light Field Emulation (s-LiFE™) segment of the optical fiber. The said high refractive index organic materials, optionally, are doped in the preform before the making of optical fiber or evaporated into the optical fiber after it's made under the softening temperatures of the cladding.

In a second aspect of the invention, the Surface Light Field Emulation (s-LiFE™) segment of the optical fiber further comprises a coating disposed entirely or partially on the exterior of the cladding. The coating has a thickness at least 25% of the thickness of the cladding underneath. In one example of the invention, the coating is a blend of one or more thermoplastic polymers, which is co-extruded onto the optical fiber. In another example of the present invention, the coating is a thermoset comprising a cured mixture of acrylate monomers and oligomers.

In a second embodiment of the first aspect of the invention, the nanoscale diffusion centers comprise nanoscale geometric patterns in the coating, the said geometric patterns result in modulation of the refractive index in the coating. The nanoscale geometric patterns include physical patterns (i.e. nano-sized structures which can be characterized by surface profilometry methods) and composition patterns caused by refractive index differences of the materials employed in the cladding.

The said physical patterns are composed of a plurality of random oriented periodic nanostructures and each nanostructure comprises a peak and a valley. The distance between one peak and its nearest neighboring peak in the periodic nanostructures is in the range of 30 nm-1200 nanometers, preferably 30-200 nanometers. The periodic nanostructures have an average roughness of 8-600 nanometers, preferably 25-100 nanometers.

The said composition patterns are composed of structural moieties having high refractive indexes (i.e. "peaks") and materials having low refractive indexes (i.e. "valleys"), with at least some refractive index differences between the "peaks" and "valleys" greater than 0.03-0.05. The "peaks" and "valleys" are part of the continuous polymer phase of the cladding. The composition patterns have no defined geometry and location. In a first embodiment, the said composition patterns are formed by using monomers (A, B) with different refractive indexes, wherein said monomers after being polymerized to make the coating, resulting in a mixture of compositions (AA, AB, BB etc) with different local refractive indexes. In a second embodiment, the said composition patterns are created by polymers having more than one phase, and different phase have different refractive indexes, such as liquid crystal polymers. In a third embodiment, the said composition patterns are created by monomers or other small molecules diffused into an already-formed polymer cladding, wherein the said monomers or small molecules have 3-4% more or less refractive index values than that of the existing cladding.

Further, in the aforementioned first embodiment, the specific location of the "peaks" and "valleys" cannot be accurately controlled, however the refractive indexes of "peaks" and "valleys" or the difference between the "peaks" and "valleys" can be modulated. In one example, changing the overall degree of polymerization or cross-linking density of polymer, the composition ratio between un-reacted monomers, partially reacted monomers and completely converted monomers are changed and the corresponding refractive indexes are also changed. In another example, some monomers with relative high or low refractive index (Rf) within the starting monomers can be preferentially polymerized, by using any number of methods including attaching monomers to more reactive functionalities, selectively UV radiating with a preferred wavelength, or adopting a stepwise temperature profile. As a result, the cladding composition is altered and so are the respective refractive indexes.

In accordance with the present invention, the physical patterns are located in the coating of the said Surface Light Field Emulation (s-LiFE) segment of the optical fiber. The coating has a thickness of at least 250 nanometers. In one example of the invention, periodic nanostructures or parts of the peak or valley are at the coating/environment interface. In another example, periodic nanostructures or parts of the peak or valley are only in the thickness of the coating, between the coating/air and cladding/coating interfaces. In a more preferred example, the periodic nanostructures or parts of peak or valley structures are at the coating/cladding interface.

In a second embodiment of the second aspect of the invention, the nanoscale diffusion centers further comprise dye molecules in the coating of the said Surface Light Field Emulation (s-LiFE) segment. The dye molecules include, but are not limited to, organic fluorescent dyes, phosphorescent dyes and quantum dots.

The dye molecules are evenly dispersed in the coating of the said Surface Light Field Emulation (s-LiFE) segment of the optical fiber. Different dye molecules are selected in accordance with their absorption/emission spectra and their quantum efficiencies, in order to meet the desired color and efficiency requirement of the Surface Light Field Emulation (s-LiFE) optical fiber. And the distance between the dye molecules or the aggregate thereof, and their interactions with other nanoscale diffusion centers are optimized to achieve different desired emission patterns and effects.

In a third embodiment of the invention of the second aspect of the invention, the nanoscale diffusion centers further comprise nanoparticles in the coating of the said Surface Light Field Emulation (s-LiFE) segment of the optical fiber. The nanoparticles include fluorescent and phosphorescent dye labeled polymer beads, like Chromeon-marked Polyacrylnitrile (PAN Beads-Biotin, PAN Beads-Streptavidin, PAN Beads carboxylated) and PD Beads (PD-Chromeon 470, PD Beads carboxylated, PD Beads Streptavidin), and inorganic nanoparticles like polymer bound metal oxides ($Fe_2O_3$, $TiO_2$, ZnO, $BaSO_4$ etc). The nanoparticles have average diameters less than 50 nm. The dye bound polymer nanoparticles absorb light fall within their respective absorption spectra, re-emit in different wavelengths in different directions. Both organic and inorganic nanoparticles scatter and re-direct incident lights into different directions, which often offers higher local brightness in side emission than other techniques. In one example, the nanoparticles are in 0.5-10 ppm in the said Surface Light Field Emulation (s-LiFE™) segment.

Nanoparticles can be homogeneously suspended with monomers, which will form the optical fiber coating. Then through a regular optical fiber pulling process, the monomers will crosslink by either thermal or UV cure to form appropriate structure. Nanoparticles will co-exist in the cross-linked polymers as a small amount of dopant. The concentration of the nanoparticles is controlled at around 0.5-10 ppm w.r.t the total weight of monomers to form the coating, whereas 1 ppm or less is a preferred concentration.

In a fourth embodiment of the second aspect of the invention, the nanoscale diffusion centers further comprise high refractive index organic materials in the coating of the said Surface Light Field Emulation (s-LiFE) segment of the optical fiber. The said high refractive index organic materials include halogenated materials and aromatic materials, which have higher refractive indexes than that of the coating material. The local refractive index change in the coating changes the light distribution between the core and cladding so that more light is re-directed out. The halogenated materials are primarily a halogenated hydrocarbon group having 1 to 19 carbon atoms, with one or more hydrogens being substituted by a chlorine, bromine or iodine atom, whereas bromine and iodine are more preferred than chlorine. Furthermore, the halogenated materials optionally contain aromatic groups such as phenyl and naphthyl groups, in such examples, the said halogens are preferably attached to aromatic carbons. Depending on the refractive index of the coating, the said aromatic materials with refractive indexes higher than that of the coating material include, for example, methoxynaphthalene, which has a refractive index of 1.62 and dodecylbenzene, which has a RI of 1.48.

In one example, the said high refractive index organic materials are uniformly dissolved through the thickness of the coating. In another example, halogenated materials are dissolved throughout the cladding with a concentration gradient. Halogenated materials are 1-10 wt % of the total weight of the Surface Light Field Emulation (s-LiFE™) segment of the optical fiber. The high refractive index organic materials, optionally, are mixed with the coating compositions before it is cured.

In the third aspect of the invention, a first embodiment, the optical fiber is a glass fiber. The coating is either a thermoplastic or thermoset. The coating has a refractive index value (Rf) between the cladding (Rf~1.7) and air (Rf=1). In one example, the coating has a Rf about 1.46 is formed by solutions of 1% to 10% Poly(propylene oxide) (refractive index=1.457) in 2-methoxy propanol. These solutions are prepared by stirring polypropylene oxide) in 2-methoxy propanol containing 0.5% surface leveling agent (for example BYK-300). Said solutions are applied to optical fiber by passing the optical fiber through the coating solution, and the solvent is removed by passing the coated optical fiber through a heating zone wherein the solvent is evaporated. Temperatures in the heating zone ranges from 40 degrees C. to 150 degrees C.

In a second embodiment of the third aspect of the invention, the optical fiber is a plastic fiber. The plastic optical fiber is comprised of any of polycarbonate (PC), polystyrene (PS), polymethylmethacrylate (PMMA), methylmethacrylate styrene copolymer, styrene acrylonitrile, methylpentene, and allyl diglycol carbonate. The coating has a refractive index value between the cladding (Rf~1.3-1.6) and air (Rf=1).

In one example, the cladding is a PMMA having a Rf of approximately 1.46. According to this invention, the corresponding coating is a processable UV curable formulation that provides a cured coating with a refractive index less than approximately 1.46.

Coating Compositions

One set of exemplary coating formulations comprises at least one ethylenically unsaturated monomer that is capable of free radical initiated addition polymerization and has a refractive index of approximately 1.46 or lower. The said monomers include ethoxyethoxy ethyl acrylate, tripropylene glycol diacrylate and mixtures of thereof. The said coating formulations further comprise a curing agent (for example, photo initiator Irgacure 819), and a surface agent (for example, BYK300). Preferably, the coating monomers ethoxyethoxy ethyl acrylate and tripropylene glycol diacrylate are formulated in a ratio between 1:10 to 10:1 by weight.

Another set of exemplary coating formulations comprise 5-20% a metallic monomer in a substituted alkyl diacrylates with a refractive index less than approximately 1.46. Preferable metallic monomers include metallic acrylate esters such as zinc acrylate esters, metallic acrylate oligomers such as zinc acrylate oligomers, and mixtures thereof (for example, Sartomer CN2400). The said substituted alkyl diacrylates include alkoxylated neopentylglycol diacrylate with a refractive index of approximately 1.45 (for example, Sartomer SR206, or Sartomer SR9043, or mixtures thereof). The said coatings optionally further contain a curing agent. Optionally, coating formulations further include an aliphatic monoacrylate (for example Sartomer SR256) and/or an aliphatic monoacrylate oligomer with a refractive index less than approximately 1.46, for example Sartomer CN152 with a refractive index of 1.433.

Still another exemplary coating formulation comprises silicone acrylates with refractive index less than 1.46 and a curing agent.

A fourth aspect of the present invention is directed towards an illumination system comprising a plurality of optical fibers comprising Surface Light Field Emulation (s-LiFE) segment of the present invention are arranged in an array, a layer, a bundle or a combination of them, and the said optical fibers are in optical communication with at least one light source. The said light source includes both engineered light sources and natural light sources. Engineered light sources includes LED, OLED, laser etc and natural light sources include sunlight, environmental light, and the like.

The said illumination system further comprises a substrate. The optical fibers in this invention can be woven into or stitched thereto or attached by any desired method to the substrate, which does not interfere with the intended light handing properties. The plurality of fibers may emit a variety of colors. The said system may optionally further comprises a controlling switch to control emission from the individual fibers.

In one embodiment of the fourth aspect of the invention, the said substrate is a piece of fabric or upholstery comprising textile fibers.

In another embodiment of the fourth aspect of the invention, the illumination system is an article comprising polymers that can be processed into yarn or made into a fabric by interlacing in a variety of methods, including weaving, knitting and braiding. The said system further comprises polymers having reflective surfaces.

Appropriate nanoscale diffusion centers are selected, in combination with optical fiber geometry (length and diameter) and the characteristics of the light source, to achieve optimal illuminating patterns with aesthetic appearance and artistic values.

The choice of materials of the optical fibers, diffusion centers and any coatings will depend upon the light handing properties as well as any requirements from the intended use environment. Careful selection of materials will deliver a high performance product with a reasonable cost.

These and other objects and advantages of the present invention will be more apparent and better understood through consideration of the following drawings and the detailed description of the invention that follows.

While only certain features of the invention have been illustrated and described herein, many modifications and changes will occur to those skilled in the art. It is, therefore, to be understood that the appended claims are intended to cover all such modifications and changes as fall within the true spirit of the invention.

BRIEF DESCRIPTION OF DRAWINGS

Various aspects of at least one embodiment are discussed below with reference to the accompanying figures, in which dimensions are not intended to be drawn to scale and angles are only for illustrative purpose and not intended to be used to indicate the degrees. Where technical features in the figures, detailed description or any claim are followed by reference signs, the reference signs have been included for the sole purpose of increasing the intelligibility of the figures, detailed description and/or claims. In the figures, each identical or nearly identical component that is illustrated in various figures is represented by a like reference sign. For purposes of clarity, not every component may be labeled in every figure. The figures are included to provide an illustration and a further understanding of the various aspects and embodiments, and are incorporated in and constitute a part of this specification, but are not intended as a definition of the limits of the invention. In the figures:

DETAILED DESCRIPTION

It is to be appreciated that embodiments of the methods and apparatuses discussed herein are not limited in application to the details of construction and the arrangement of components set forth in the following description or illustrated in the accompanying drawings. The methods and apparatuses discussed herein are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments. Any references to embodiments or elements or acts of the systems and methods herein referred to in the singular may also embrace embodiments including a plurality of these elements, and any references in plural to any embodiment or element or act herein may also embrace embodiments including only a single element.

It is also to be appreciated that the phraseology and terminology used herein is for the purpose of description and should not be regarded as limiting. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, and upper and lower are intended for convenience of description, not to limit the present systems and methods or their components to any one positional or spatial orientation.

General Definitions

"Polymer" means a polymeric compound prepared by polymerizing monomers, whether of the same or a different type. The generic term "polymer" embraces the terms "homopolymer," "copolymer," "terpolymer" as well as "interpolymer."

Nanoscale Geometric Patterns

Figure 1:
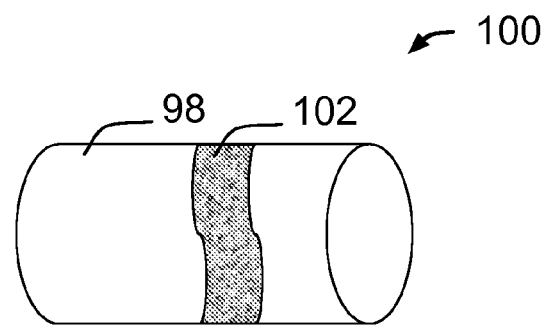
FIG. 1 is an illustration of one example of an optical fiber with Surface Light Field Emulation (s-LiFE) segment, in accordance with aspects of the invention.

FIG. 1 shows a modified optical fiber (100), which is modified from optical fiber (98), having a segment (102) comprising a Surface Light Field Emulation (s-LiFE) segment.

Figure 2:
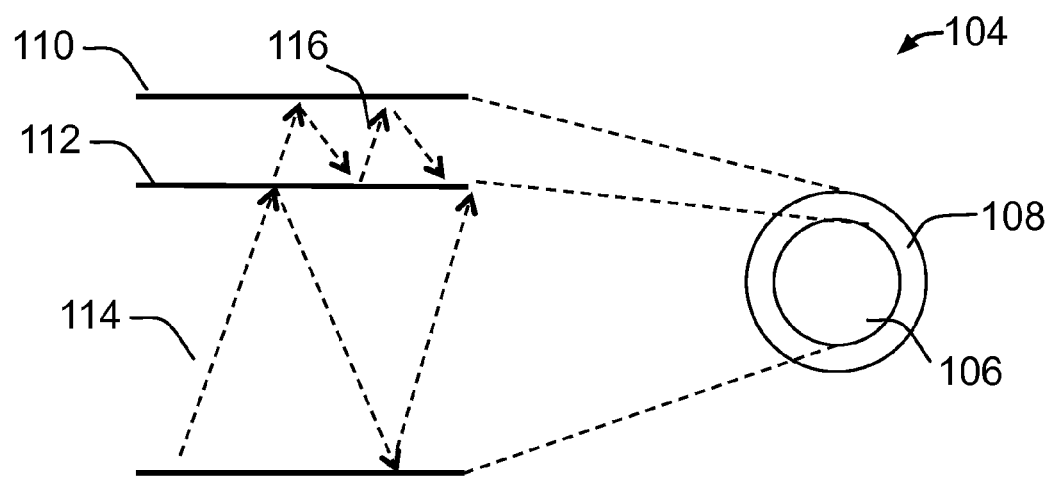
FIG. 2 is an illustration of one example of optical fiber with no nanoscale geometric patterns and the light propagates as guided mode in the core and cladding mode in the cladding.

FIG. 2 is an illustration of an exemplary unmodified optical fiber (104). The unmodified optical fiber (104) comprises a core (106) and a cladding (108). In the unmodified optical fiber (104), the light propagation has two modes guided mode (114) and cladding mode (116). The light propagating in the core between the cladding/core interfaces (112) is called guided mode (114) and the light propagating in the cladding between the core/cladding interface (112) and cladding/air interface (110) is called cladding mode (116). There is no light that escapes from the optical fiber.

Figure 3:
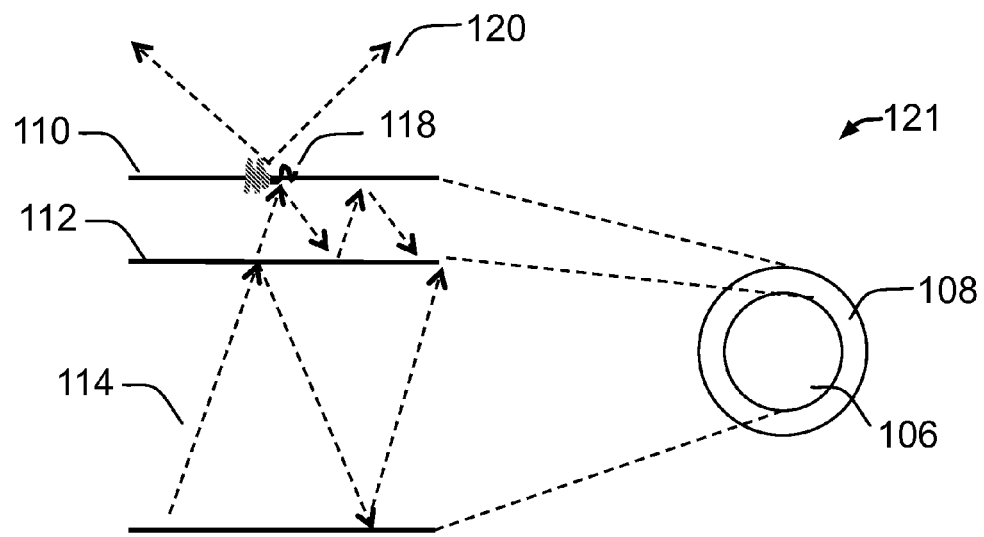
FIG. 3-5 are illustrations of examples of nanostructures with nanoscale geometric patterns in the cladding, wherein the nanostructures are at the cladding/air interface and the light exists in three modes (guided mode, cladding mode and emitting mode), in accordance with aspects of the invention.
Figure 4:
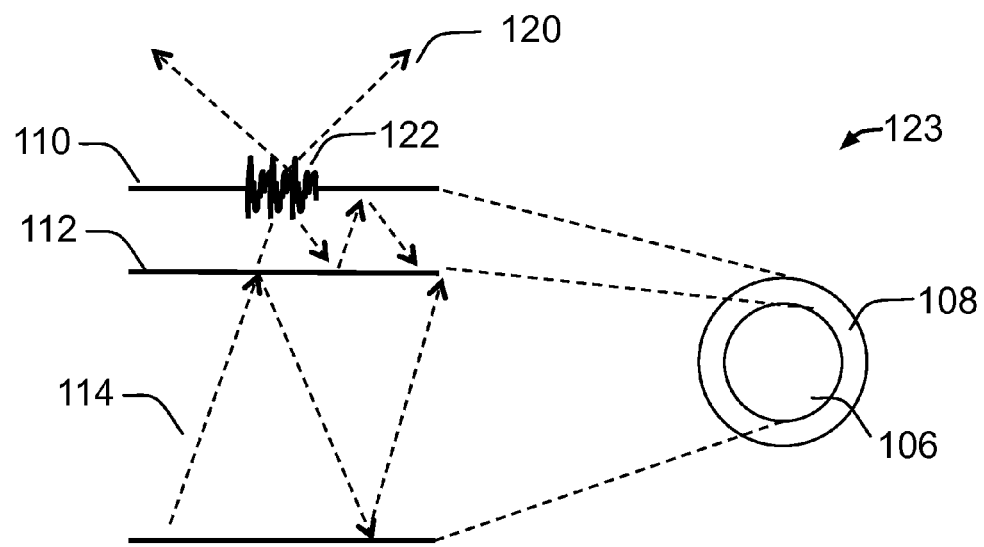
Figure 5:
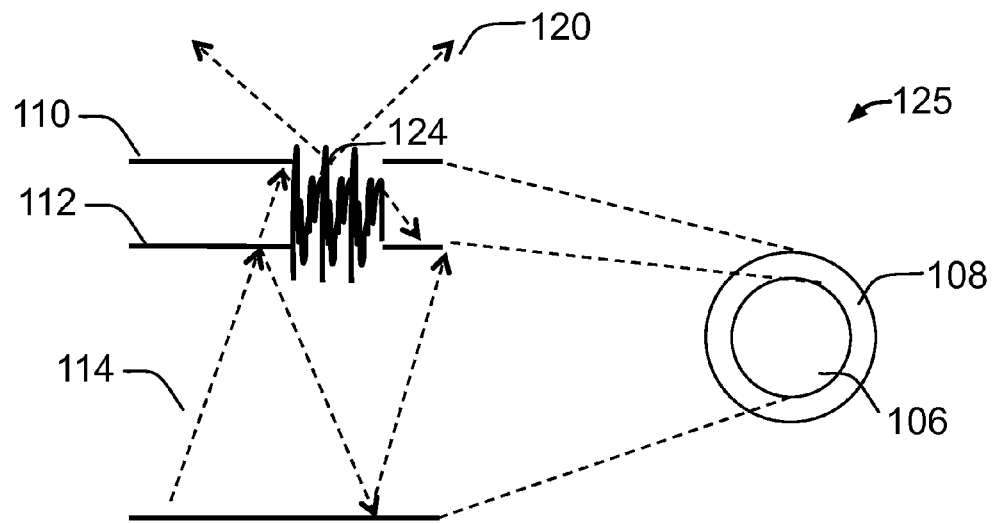

FIG. 3-5 show exemplary illustrations of the implementation of nanoscale geometric patterns in the optical fibers (121, 123, 125) with Surface Light Field Emulation (s-LiFE) segment, in accordance with the present invention. In these figures, 118, 122 and 124 illustrate three possible locations and relative scales of nanoscale geometric patterns, where all three are part of the air/cladding interface (110). 118 shows the nanoscale geometric pattern situated merely at the air/cladding interface and has more structures at the interface rather than into the cladding. 122 represents the nanoscale geometric patterns situated at the air/cladding interface but has more depth into the cladding than 118. The 124 shows the nanoscale geometric patterns touch both interfaces, air/cladding interface (110) and cladding/core interface (112), and part of the nanoscale geometric pattern structures present through the entire depth of the cladding, continuously or collectively. Because of the presence of nanoscale geometric patterns according to this invention, some light can escape from the optical fibers (121, 123, 125) through their length. Therefore there is a third mode of light propagation in these figures, besides the guided mode (114) and cladding mode (116). This third mode of light is called emissive mode (120). The light emitted out through the means of nanoscale geometric patterns in the 118, 122 and 124 is all called emissive mode, (120) which were illustrated in the FIG. 3-5. When maximum emissive mode is desired in order to realize surface emulation effect, nanoscale geometric pattern more like 124 is highly desired, 122 is the next desired and 118 is the least desired. But when an application requires most of the light stay in the guided mode (114) and/or the cladding mode (116), only a small percentage of total light to be in the emissive mode (120), then nanoscale geometric pattern, such as 118, is more desired than 122 and 124.

Figure 6:
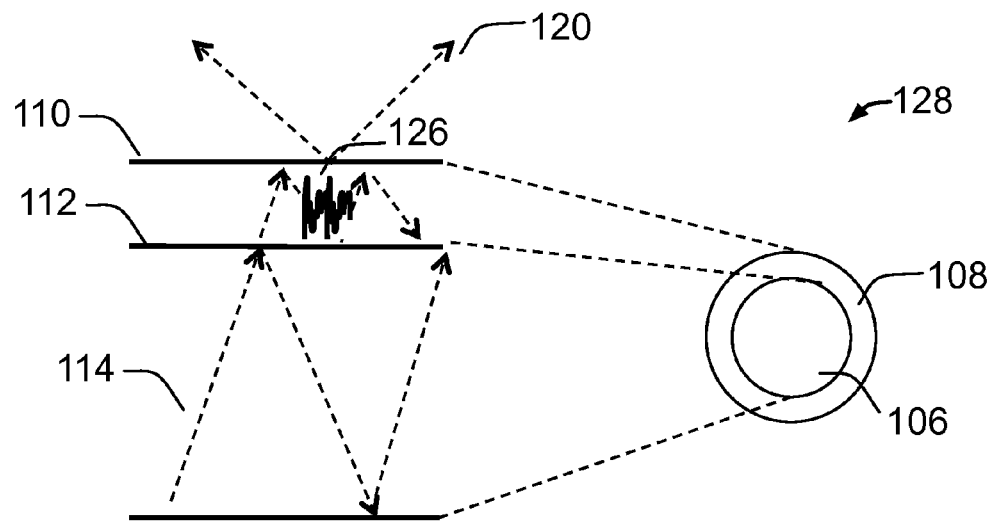
FIG. 6 is an illustration of one example of nanostructures with nanoscale geometric patterns in the cladding, wherein the nanostructures are in the cladding and the light exists in three modes (guided mode, cladding mode and emitting mode), in accordance with aspects of the invention.

FIG. 6 shows another exemplary illustrations of using nanoscale geometric pattern in accordance with the present invention. Nanoscale geometric patterns 126 situated in the cladding and its structure is not of either interface (110 and 112) and structures in 124 can be different in dimensions with respect to the thickness of the cladding (108). The light exists as guided mode (114) in the core (106), cladding mode (116) in the cladding (108) and surface emitting mode (120) radiant from the optical fiber (128). Nanoscale geometric patterns in 126 is not only capable of redirecting some light from cladding mode (116) to surface emitting mode (120), but also capable of perturbing the homogeneity of the cladding (108), leading to a rearrangement of the light distribution between the guided mode (114) and cladding mode (116), resulting a enhanced surface emitting mode (120). Nanoscale geometric patterns 126, in combination with other nanoscale geometric patterns and other techniques, the surface light field emulation effect can be careful engineered to a very fine quality.

Figure 7:
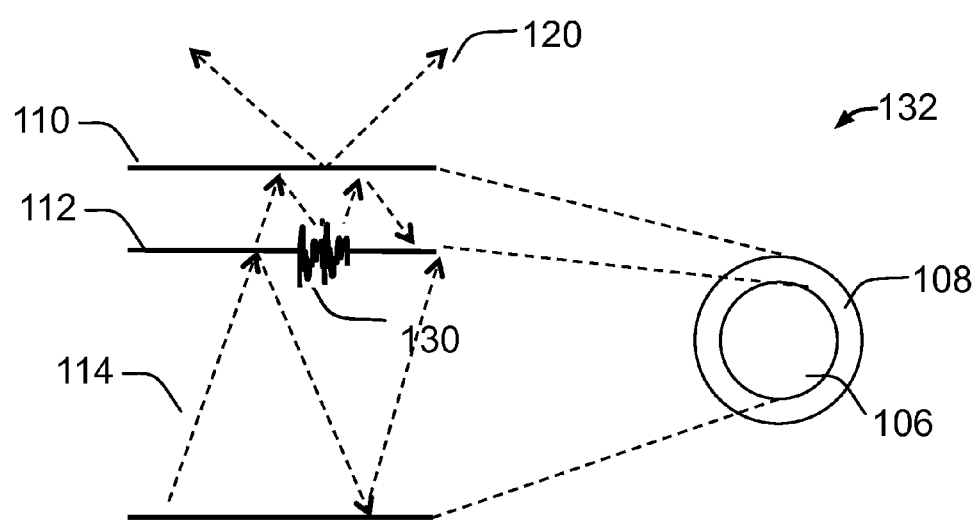
FIG. 7 is an illustration of one example of nanostructures with nanoscale geometric patterns in the cladding, wherein the nanostructures are in the core/cladding interface and the light exists in three modes (guided mode, cladding mode and emitting mode), in accordance with aspects of the invention.

FIG. 7 shows yet another exemplary illustrations of using nanoscale geometric patterns in the cladding in accordance with the present invention. Nanoscale geometric patterns 124 and 130 are both have part of their structures situated at the cladding/core interface (112). Nanoscale geometric patterns 130 shows the pattern situated merely at the cladding/core interface (112) and has more structures at the interface (112) rather than into the thickness of the cladding (108). Nanoscale geometric pattern 124 illustrates the patterns touch both interfaces, air/cladding interface (110) and cladding/core interface (112), and part of the nanoscale geometric pattern structures present through the entire thickness of the cladding (106), continuously or collectively. In this figure, the novel nanoscale geometric patterns according to this invention enabled some light to escape from the optical fiber as emitting mode (120). When maximum emissive mode is desired in order to realize surface emulation effect, nanoscale geometric patterns more like 124 is highly desired, and 130 is the next desired.

Nanoscale geometric patterns 118, 122, 124, 126, and 130 offer illustrative ways to show how the novel nanoscale geometric patterns in the present invention can carefully and accurately engineer the light distribution between the three modes, guided mode (114), cladding mode (112) and emitting mode (120) in a very fine manner, which completely separate the present invention from the surface damaging techniques, such as sand blasting, which has been previously disclosed. Such techniques, limited by the size of the damage, can only adjust the amount of light in the emitting mode in a very coarse manner.

All the exemplary nanoscale geometric patterns mentioned above in the cladding 108 operate either independently or cooperatively, in conjunction with other techniques to modulate light properties including intensity, polarization, wavelength and angles with finest details and accurate control to fulfill a specific light field emulation effect. Such effects include the ability to mimic the surface of a precious metal, fine jewelry, and that of biological nanostructures in nature, butterfly wings and the like.

Figure 8:
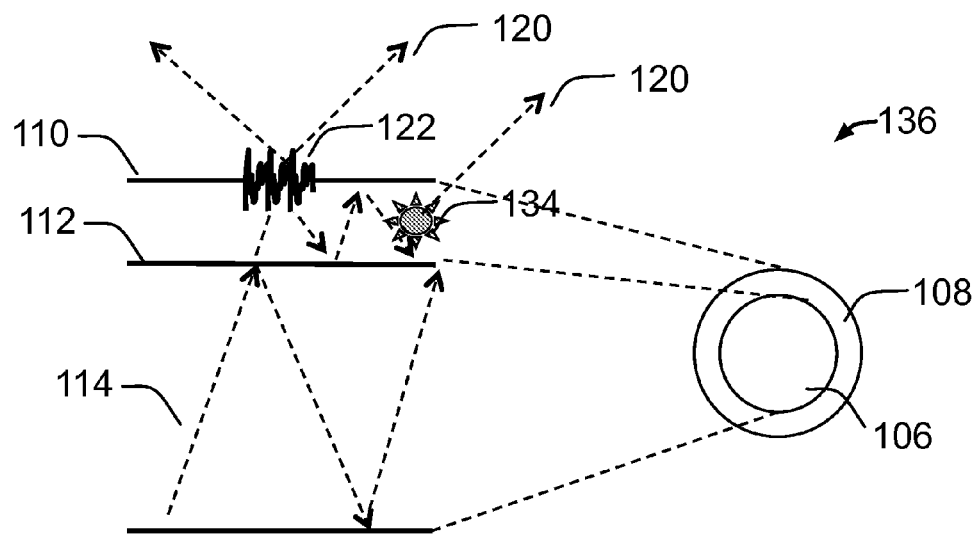
FIG. 8 is an illustration of one example of nanoscale geometric patterns in combination with dyes in the cladding, and the light exists in three modes (guided mode, cladding mode and emitting mode), in accordance with aspects of the invention.
Figure 9:
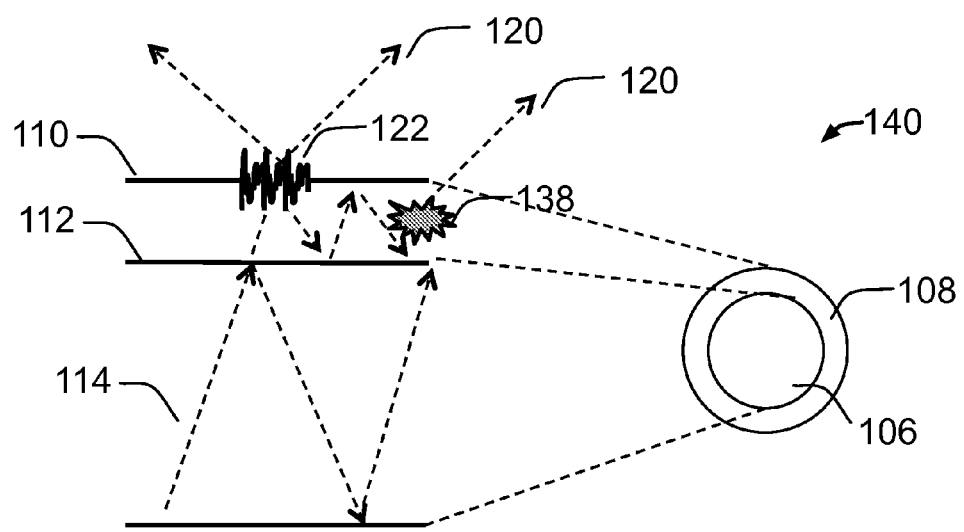
FIG. 9 is an illustration of one example of nanoscale geometric patterns, in combination with nanoparticles in the cladding, and the light exists in three modes (guided mode, cladding mode and emitting mode), in accordance with aspects of the invention.
Figure 10:
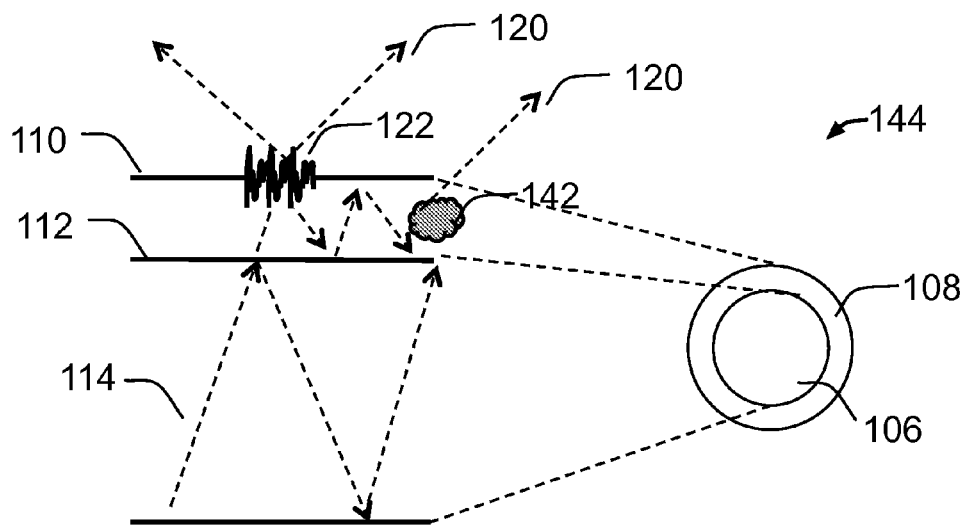
FIG. 10 is an illustration of one example of nanostructures geometric patterns, in combination with highly halogenated organic molecules (with higher refractive index than that of the cladding, and the light exists in three modes (guided mode, cladding mode and emitting mode), in accordance with aspects of the invention.

FIG. 8-10 shows another embodiments of the invention wherein nanoscale geometric patterns are used together with one or more techniques to achieve surface light field emulation effect. FIG. 8, FIG. 9 and FIG. 10 further include illustrative representation of a dye (134), a nanoparticle (138) and a halogen material (142) in the cladding (108).

Figure 11:
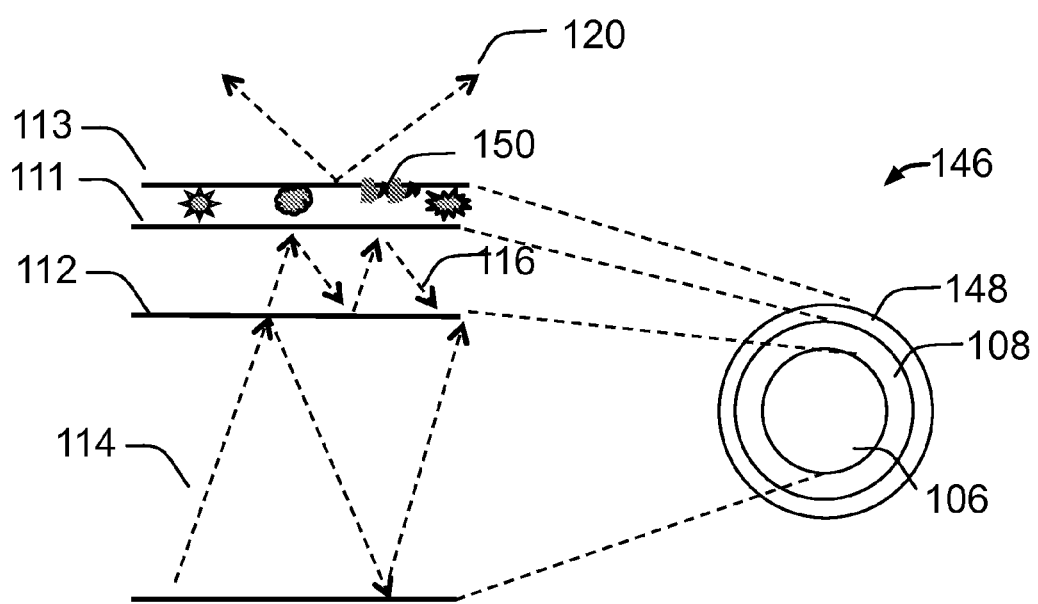
FIG. 11 is an illustration of one example of a coating covering the optical fiber, on the exterior of the cladding.

FIG. 11 shows another alternate embodiment with the optical fiber (146) further having a coating (148) on the exterior of the cladding (108). Different coating patterns are all possible as the different coating materials and coating process can be selected and designed to be useful and practical within the scope of the present invention.

FIG. 11 shows an exemplary illustration of the implementation of nanoscale geometric patterns in the coating of the optical fiber (146) with Surface Light Field Emulation (s-LiFE) segment. Nanoscale geometric pattern 118 situated at the air/coating interface (113) is depicted in FIG. 11. But all other possible nanoscale geometric patterns in different scales at air/coating interface (113), or coating/cladding interface (111), or both, or even cladding/core interface (112) are all possible in the scope of the present invention. In addition, one or more dye molecules (134) one or more nanoparticles (138) and one or more halogen materials (142) can also add into the coating, leading to a wide variety of rearrangement of the light distribution among the guided mode, cladding mode and second cladding mode, as a result light as emitting mode is also changed.

The exemplary nanoscale geometric patterns in the coating can operate either independently or cooperatively in conjunction with the techniques employed in the cladding to modulate light properties including intensity, polarization, wavelength and angles with detailed and accurate control to fulfill a specific light field emulation effect. Such effects includes the ability to mimic the surface of a precious metal, fine jewelry, and that of biological nanostructures in nature, butterfly wings and the like.

In summary, s-LiFE segment is capable of not only allowing side emission but also precise engineering control of the emission properties including intensity, wavelength and polarization. As a result, special visual effects, such as sparkling, shining, color-changing with viewing angles, can be achieved to make the optical fiber surface to emulate the surface of a diamond, gold and silver. For example, a sparkling effect, such as from a tiny diamond can be achieved by modulating light intensity while confining the emitted light through a fixed by a small (s-LiFE) center. A metallic shine can be simulated using proper filtering of a white light source to allow emission exhibit similar optical spectrum as the optical reflection from a gold surface.

Below is more detail description of dyes and nanoparticles.

Dyes

A wide range of dyes is suitable for this invention, including florescent dyes and phosphorescent dyes.

Partial listings of members of various families of fluorescent dyes follow: Pyrromethene family: Pyrromethene 597 [1,3,5,7,8-pentamethyl-2,6-di-t-butylpyrromethene-difluoroborate complex], Pyrromethene 567 [1,3,5,7,8-pentamethyl-2,6-diethylpyrromethene-difluoroborate complex], Pyrromethene 556 [Disodium-1,3,5,7,8,-pentamethylpyrromethene-2,6-disulfonate-difluoroborate complex], Pyrromethene 546 [1,3,5,7,8,-pentamethylpyrromethene-difluoroborate complex], Pyrromethene 580 [1,3,5,7,8-pentamethyl-2,6-di-n-butylpyrromethene-$BF_2$ complex], Pyrromethene 570 [1,3,5,7,8-pentamethyl-2,6-di-n-butylpyrromethene-$BF_2$ complex];

[Coumarin family: Coumarin 152 (Coumarin 485 [7-Dimethylamino-4-trifluoromethylcoumarin]), Coumarin 339, Coumarin 1 (Coumarin 47; Coumarin 460 [7-Dimethylamino-4-methylcoumarin]), Coumarin 138 [7-Dimethylamino cyclopenta-coumarin], Coumarin 102 (Coumarin 480), Coumarin 151 (Coumarin 490 [7-Amino-4-trifluoromethylcoumarin]), Coumarin 314 (Coumarin 504), Coumarin 30 (Coumarin 515), Coumarin 307 (Coumarin 503 [7-Ethylamino-6-Methyl-4-trifluoromethylcoumarin]), Coumarin 334 (Coumarin 521), Coumarin 343 (Coumarin 521), Coumarin 7 (Coumarin 535 [3-(2'-Benzimidazolyl)-7-N,N-diethylaminocoumarin]), Coumarin 6 (Coumarin 540]);

The most notable members of the Xanthene family are the Rhodamines, whose family includes: Rhodamine 110 (Rhodamine 560), Rhodamine 6G Tetrafluoroborate (Rhodamine 590 Tetrafluoroborate), Rhodamine 6G Perchlorate (Rhodamine 590 Perchlorate), Rhodamine 6G (Rhodamine 590), Rhodamine B (Rhodamine 610);

Sulforhodamine family: Sulforhodamine B (Kiton Red 620; Xylene Red B), Sulforhodamine 101 (Sulforhodamine 640);

Fluorescein family: Fluorescein (Fluorescein 548; Fluorescein 27), 2'-7'-Dichlorofluorescein;

Oxazine family: Oxazine 4 Perchlorate (LD690 Perchlorate), Oxazine 170 Perchlorate (Oxazine 720 Perchlorate);

Miscellaneous: Carbostyril 124 (Carbostyril 7 [7-Amino-4-methylcarbostyril]); Cresyl Violet Perchlorate (Oxazine 9 Perchlorate; Cresyl Violet 670 Perchlorate).

The above list of dyes is intended as an example and not as a limitation. Dyes not mentioned in the above list may be used to practice the present invention. The dye concentrations are also important, as will become apparent for anyone skilled in the art with respective to the examples.

Under the appropriate conditions, the following dyes will fluoresce brightly in the blue: Coumarin 460, Exalite 392 (as well as Exalite 411, 417, 404, 428), Coumarin 503. Deep violet-blue fluorescence can be achieved using fiber doped with LDS 751 dye under long wave ultraviolet light source, and when illuminated by a tungsten halogen light source, the same fiber emits a magenta color output.

Colors of the Fluorescent Dyes

Blue-green and green-yellow colors are achieved by numerous dyes in the Coumarin family, which will produce a deeper green under long ultraviolet excitation and a yellow-green under tungsten halogen lighting.

Yellow fluorescing is achieved by dyes such as the Pyrromethene 567, which produce a bright, saturated light in the yellow region when excited with white or ultraviolet light. Pyrromethene 597 is the leader in quantum yield, fluorescing in the orange spectrum. It produces a bright saturated orange light under ultraviolet or white light illumination. Also LD 688 dye has an orange saturated output.

Orange-red color can be produced by LDS 698. There are numerous other dyes which can provide a red spectrum ranging from a light red color to a saturated deep red. Some of the dyes in this category include Rhodamine 640, which produces a highly saturated deep red fluorescent fiber. Infrared dyes such as LDS 867, LDS 751, LDS 821, LDS 923 can also be used in a dye mixture.

Phosphorescent Dyes

Phosphorescent dyes, similar to the fluorescent dyes described above, absorb light having a higher energy color, and then emit light having a lower energy color. However, unlike fluorescent dyes, which can emit their light in picoseconds, phosphorescent dyes absorb and emit light at a much slower rate. Many phosphorescent dyes will continue to emit light for a long period of time, ranging from seconds to hours, after the light having a higher energy color is removed.

Useful phosphorescent materials are known in the art. The phosphorescent materials for use in the present invention are typically organo-metallic compounds. Useful organo-metallic compounds in the present invention include those that contain iridium complexes, platinum complexes, osmium complexes, ruthenium complexes, and other organo-metallic compounds as would be known to one skilled in the art. Cyclometallated iridium compounds, such as Iridium(III)bis[(4,6-difluorophenyl)-pyridinato-N,$C^{21}$]picolinate (FIrpic) and iridium(tris-orthoiridated complex with 2-phenylpyridine (Ir(ppy)$_3$)), are well known phosphorescent dopants.

Another example of phosphorescent dyes are metal ion chelated to the phosphorescent porphyrin-type compound of group by any metal ion providing that the phosphorescent porphyrin-type compound has an absorption spectrum in the region of 400-800 nm. Suitable chelating metals for chelating with the phosphorescent porphyrin-type compounds include platinum, palladium, rhodium, and gadolinium. Preferably, the chelating metal is selected from the group consisting of platinum and palladium. More preferably, the chelating metal is platinum.

In some embodiments, a polymerizable dye is preferred. The structure, synthesis, and electronic absorption spectra of phosphorescent porphyrin-type compounds is described in more detail in, for example, The Porphyrins, David Dolphin, Ed., Academic Press, New York, Volumes 1 and 3 (1978).

Suitable dyes can be included in the mixtures or preforms before manufacturing the optical fibers or the dyes can be mixed in the coating formulation applied onto the optical fiber.

Visual Properties and Illumination Effects

The spectral output of optical fibers can be further narrowed or broadened, depending upon the dye concentration and/or dye mixture, or the length of the fiber.

Using only the dyes in the optical fiber, the light out put is of a monochromatic nature. But if in conjunction with the nanoscale geometric pattern in this invention, the light output can be created at various wavelengths, as explained in conjunction with FIG. 5. The light refraction and deflection together with the monochromatic nature of the fluorescent fiber, the optical fiber can be used to create either single color saturated visual appearance or a combination of the various colors in different patterns, even changing colors at different viewing angles like butterfly wings, when illuminated with just one light source.

Nanoparticles

In another aspect of the present invention, nanoparticles are present in the cladding or the coating. Nanoparticles tend to provide a "superradiant" emission of intense light. When light strikes nanoparticles, some is reflected and continues to propagate in the optical fiber, but some is scattered to the exterior environment.

Both organic and inorganic nanoparticles can be useful in this invention. Polymer bound nanoparticles are preferred as they provide a better mixing in either the preform of the optical fiber or coating formulations. The polymer bound nanoparticles can also form a homogeneous structure in the finished optical fiber and cured coatings.

Size

Nanoparticles with average diameters less than 50 nanometers are suitable for this application. Further, average diameters less than 30 nanometers are preferred. In one embodiment of the present invention, a thin layer of $Al_2O_3$ is coated on the desired nanoparticle to prevent flocking Concentration The concentration of nanoparticles in the optical fiber depends on the size of the nanoparticles, the length of the optical fiber and desired light coupling pattern. A desirable concentration of the nanoparticles in the optical fiber is 1-200 ppm. The more preferred concentration range will become apparent by the examples hereinbelow.

Addition Method

In one example, the nanoparticles can be added before or after the optical fiber is formed. In another example, nanoparticles can be formulated into the coating composition before it is applied. Preferably, the nanoparticles have gone through a settling and filtration process after the particles are suspended in the mixture. For example, the mixtures containing nanoparticles are stirred for a least an hour before use. This sedimentation technique has provided more uniform distribution of the nanoparticles throughout the final product.

Coatings

General Definitions

Nanoscale means a dimension from 1 nanometer to a few thousands nanometers.

The term "polymeric" is understood to include within its scope all types of molecules characterized as having repeating units of atoms or molecules linked to each other such as oligomers, homopolymers, co-polymers including block, random and alternating co-polymers, grafted polymers and co-polymers, terpolymers, etc.

"Oligomer" means a polymer molecule comprising only a few monomer units such as a dimer, trimer, tetramer, etc.

"Composition," as used herein, includes a mixture of materials which comprise the composition, as well as reaction products and decomposition products formed from the ingredients or materials of the composition.

"Formulation," as used herein, includes a mixture of materials which comprise the starting formulation, as well as reaction products and decomposition products formed from the ingredients or materials of the formulation.

The refractive index of coating monomers and additives are generally determined by suppliers or as determined with a refractometer such as Fischer Scientific Refractometer Model #6208. In general, the refractive indices of the cured polymers may rise upon curing by approximately 0.01 to 0.03. Cured refractive indices can be measured by various techniques as known in the art, such as ellipsometry.

In one embodiment, the coating comprises a thermoplastic polymer. The coating is made by dissolving the thermoplastic polymer in a solvent to obtain the desired viscosity for application. After application of the coating, the solvent is removed, for example, through heating.

In another embodiment, the coating comprises a thermoset polymer. In one example, the coating formulation including monomers and other necessary additives are dissolved in a in a solvent to obtain the desired viscosity for application. After application of the coating, the solvent is removed, for example, through heating. In a preferred example, the coating formulation is a substantially solvent free. "Substantially solvent free" refer to the polymerizable composition having less than 5 wt-%, 4 wt-%, 3 wt-%, 2 wt-%, 1 wt-%, and 0.5 wt-% of (e.g. organic) solvent. The concentration of solvent can be determined by known methods, such as gas chromatography. Solvent concentrations of less than 0.5 wt-% are preferred. In yet another embodiment, the coating comprises no solvent and relies on the formulation of monomers to control viscosity The coating formulation can be a solid or comprise a solid component at room temperature, provided that the melting point in the polymerizable formulation is less than the coating temperature. The coating formulation can be a liquid at ambient temperature.

Curing Agent

The curing agent employed in the curable acrylate coating composition is at least one photo-initiator or at least one thermal-initiator effective to promote polymerization of the curable acrylate coating composition when respectively exposed to ultraviolet radiation or heat. Suitable materials for use as a curing agent are identified in the U.S. Pat. No. 4,576,850, in the U.S. Pat. No. 6,848,986 and in such reference works as Encyclopedia of Polymer Technology. Examples of initiators include organic peroxides (e.g., benzoyl peroxide), azo compounds, quinones, nitroso compounds, acyl halides, hydrazones, mercapto compounds, pyrylium compounds, imidazoles, chlorotriazines, benzoin, benzoin alkyl ethers, diketones, phenones, benzoin ethers, hydroxy and alkoxyalkyl phenyl ketones, thioalkylphenyl morpholinoalkyl ketones acyl phosphine oxides and mixtures thereof. Examples of suitable commercially available, ultraviolet-activated photoinitiators are sold under the trade designations IRGACURE 651, IRGACURE 184, IRGACURE 369 and IRGACURE 819 (Bis(2,4,6-trimethylbenzoyl)-phenylphosphineoxide), all commercially available from the Ciba Geigy Company, Lucirin TPO-L, commercially available from BASF Corp. and DAROCUR 1173 commercially available from Merck & Co. Examples of suitable commercially available, thermal initiators are sold under the trade designations VAZO 52, VAZO 64 and VAZO 67 azo compound thermal initiators, all commercially available from E.I. duPont deNemours and Co. Exemplary curing agent particularly useful in many instances is a commercially available material designated IRGACURE 819 photoinitiator.

The curing agent is typically present in the curable acrylate coating composition in an amount corresponding to from about 0.1 to about 3.0 weight percent based on the total weight of the curable acrylate coating composition. In another embodiment the curing agent is present in an amount corresponding to from about 0.2 weight percent to about 1.0 weight percent based on the total weight of the curable acrylate coating composition. In a preferred embodiment the curing agent is present in an amount corresponding to from about 0.4 weight percent to about 0.6 weight percent based on the total weight of the curable acrylate coating composition.

Leveling Agent

Further, the curable compositions include a leveling agent. Leveling agents, also called flow agents, are added to improve the film quality of the coating, improve the finished appearance of coating layers and allow uniform coating in the formation of thin films. Such leveling agents include silicone leveling agents and ether or ester leveling agents. Silicone leveling agents include, a BYK series BYK 353, BYK 356, BYK 322, BYK 371 and BYK 300 of BYK Additives & Instruments, a Sshmego series of Sshmegmann and Efca 30, Efca 31, Efca 34, Efca 39, Efca 83, Efca 86 and Efca 88 manufactured by Efca Chemicals. Ether or ester leveling agents include, for example, Carphynol of Nisshin Kagaku Kogyo Co., Ltd. and EMARGEN and HOMOGENOL manufactured by KAO CORPORATION.

The amount of the leveling agent used is preferably from 0.01 to 5% by weight, and more preferably from 0.02 to 1% by weight, based on the whole composition.

The leveling agent can be added at the beginning in preparing the composition or at an intermediate stage where a coating is formed in a stepwise process.

Composition 1

The coating composition contains at least one ethylenically unsaturated monomer that is capable of free radical initiated addition polymerization, has a refractive index of 1.46 or lower, and is compatible with the coating process and other monomers. The monomer usually will contain the unsaturated group in the terminal position. A liquid monomer will generally be selected, but solid monomers can be used, generally in combination with one or more liquid monomers, provided the solid monomer is capable of dissolved substantially in the solid film composition.

A preferred class of monomers for use in the compositions of this invention are liquid, ethylenically unsaturated compounds capable of addition polymerization and having a refractive index of 1.46 or lower. The monomer contains substituted groups, such as lower alkyl, alkyoxy, hydroxy, combinations thereof, may be present provided that the monomer remains liquid and dissolvable in the cured mixture. Representative liquid monomers include: ethoxyethoxy ethyl acrylate, with a refractive index of 1.4366 (Sartomer 2560, tripropylene glycol diacrylate, which has a refractive index of 1.4485, Sartomer 306, mixtures thereof.

TABLE 1

First sets of coating formulations

| Chemical Name | Catalog number | Refractive index | Parts by weight |
|---|---|---|---|
| Formulation 1: | | | |
| ethoxyethoxy ethyl acrylate | Sartomer SR256 | 1.4366 | 50 |
| tripropylene glycol diacrylate | Sartomer SR306 | 1.4485 | 50 |
| | Irgacure 819 | | 0.5 |
| | BYK 300 | | 0.25 |

TABLE 1-continued

First sets of coating formulations

| Chemical Name | Catalog number | Refractive index | Parts by weight |
|---|---|---|---|
| Formulation 2: | | | |
| ethoxyethoxy ethyl acrylate | Sartomer SR256 | 1.4366 | 25 |
| tripropylene glycol diacrylate | Sartomer SR306 | 1.4485 | 75 |
| | Irgacure 819 | | 0.5 |
| | BYK 300 | | 0.25 |
| Formulation 3: | | | |
| ethoxyethoxy ethyl acrylate | Sartomer SR256 | 1.4366 | 75 |
| tripropylene glycol diacrylate | Sartomer SR306 | 1.4485 | 25 |
| | Irgacure 819 | | 0.5 |
| | BYK 300 | | 0.25 |

Composition 2

Metal Acrylate

Another set of formulations includes a metallic acrylate or diacrylate in a substituted diacrylate with a refractive index lower than 1.46.

Metal acrylates, wherein the metal can comprise at least one member selected from the group consisting of zinc (e.g., 2-propenoic acid zinc salt), aluminum, magnesium, tin, copper, nickel, aqueous solutions of acrylate (e.g., aqueous solutions of metal acrylate monomer such as zinc acrylate monomer), among others. While any suitable metal diacrylate or ZDA/ZDMA compounds or modified ZDA/ZMA compounds can be employed, examples of commercially available ZDA/ZDMA products comprise: SR 633, SR634, CN9016, CN 2401, CN2400, PC 300, PRO 5903, M Cure 204, SR 705, SR 706, SR 709 and aqueous solutions of zinc acrylate and a non-metallic acrylate monomer such as CD-664 and CD665 all of which are available from Sartomer, Exton Pa. 19341. Non-metallic acrylates (and other compatible organic compounds) can be combined with the metal diacrylate in order to modify the system, increase cure rate or hardness, among other beneficial improvements. The particle size of the metal diacrylate or dimethacrylate can be varied thereby permitting production of thin and thick film formulations (e.g., Sartomer® CN2400 and CN 2401 are commercially available as liquids; SR 9016 comprises particles ranging from about 40 to about 50 microns and SR 633 comprises particles having a standard 200 mesh). If desired, the metal diacrylate or dimethacrylate can be dispersed or dissolved within at least one carrier prior to compounding into a system, e.g., water and other solvents. When the metal diacrylate comprises ZDA/ZDMA, the amount of ZDA/ZDMA ranges from about 1 to about 75 wt. % and typically about 5 to about 20 wt. % of metal diacrylate (e.g., about 5 to about 10 wt. % for one coating system).

The said substituted diacrylates include substitutions such as lower alkyl, alkoxy, hydroxy, combinations thereof.

TABLE 2

Second sets of coating formulations

| Chemical Name | Catalog number | Refractive index | Parts by weight |
|---|---|---|---|
| Formulation 4: | | | |
| a metallic acrylate | Sartomer CN2400 | | 5 |
| ethylene glycol diacrylate | Sartomer SR206 | 1.4473 | 100 |
| Formulation 5: | | | |
| a metallic acrylate | Sartomer CN2400 | | 20 |
| ethylene glycol diacrylate | Sartomer SR206 | 1.4473 | 100 |
| Formulation 6: | | | |
| a metallic acrylate | Sartomer CN2400 | | 5 |
| alkoxylated neopentylglycol diacrylate | Sartomer SR9043 | 1.4473 | 100 |
| Formulation 7: | | | |
| a metallic acrylate | Sartomer CN2400 | | 5 |
| ethylene glycol diacrylate | Sartomer SR206 | 1.4473 | 100 |
| | Sartomer SR256 | | |
| Formulation 8: | | | |
| a metallic acrylate | Sartomer CN240 | | 5 |
| ethylene glycol diacrylate | Sartomer SR9043 | 1.4473 | 100 |
| mono acrylate oligomer | Sartomer CN152 | 1.433 | |

Composition 3

Also included in the invention are formulations comprising at least one silicone acrylate. Silicon acrylate also known as an acrylated siloxane or acrylated polysiloxane. Silicone acrylates are polymerizable and present in the coating compositions of the invention in an amount that is at least 0.01 weight percent. Examples of suitable organosilicon materials include CN9800 from Sartomer.

The coating herein invented is designed to provide protection and mechanical strength for the optical fiber, as well as aforementioned appropriate light handing properties in the second aspect of present invention. Detailed coating compositions are further optimized to meet specific end use requirements, such as thermal (Tg), adhesion, mechanical (toughness, flexibility and abrasion resistant), anti-finger print properties, environmental (hydrophobicity and solvent resistant) and non-photo yellowing properties. Therefore, the curable acrylate coatings may, optionally, further comprise one or more additives selected from the group consisting of flame retardants, antioxidants, thermal stabilizers, ultraviolet stabilizers, dyes, colorants, antistatic agents, and the like, and a combination comprising at least one of the foregoing additives, so long as they do not deleteriously affect the polymerization of the composition or its end use. Selection of particular additives and their amounts employed may be performed by those skilled in the art without undue experimentation.

System

Figure 12:
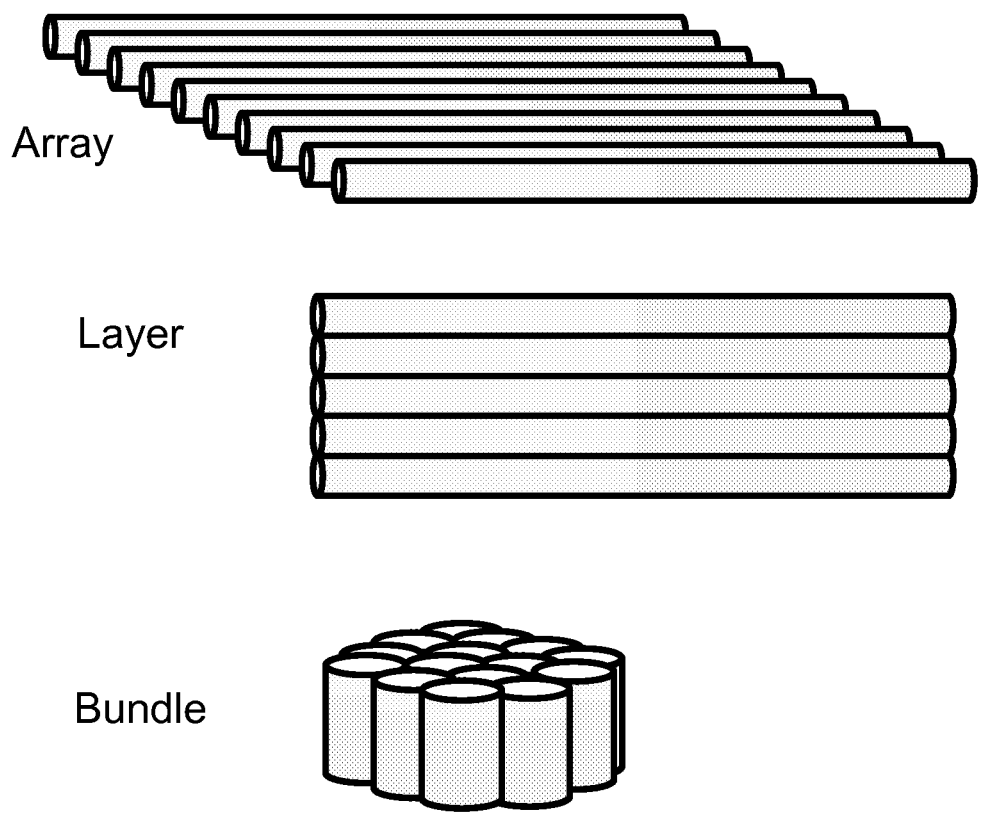
FIG. 12 is an illustration of examples of optical fibers arranged into an array, a layer and a bundle.
Figure 13:
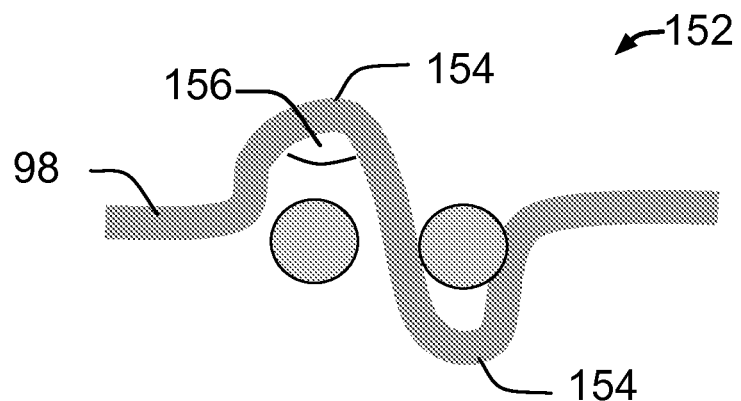
FIG. 13 is an illustration of a micro-bending of one optical fiber.
Figure 14:
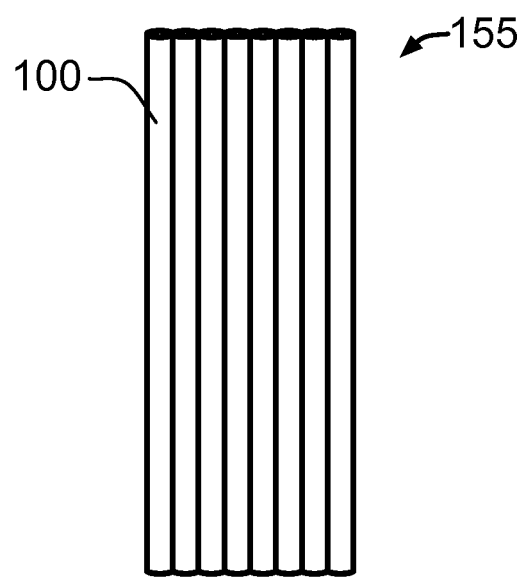
FIG. 14 is an illustration of optical fibers, in accordance with this invention, which are adhered into a piece of seamless textile having zero micro-bending.
Figure 15:
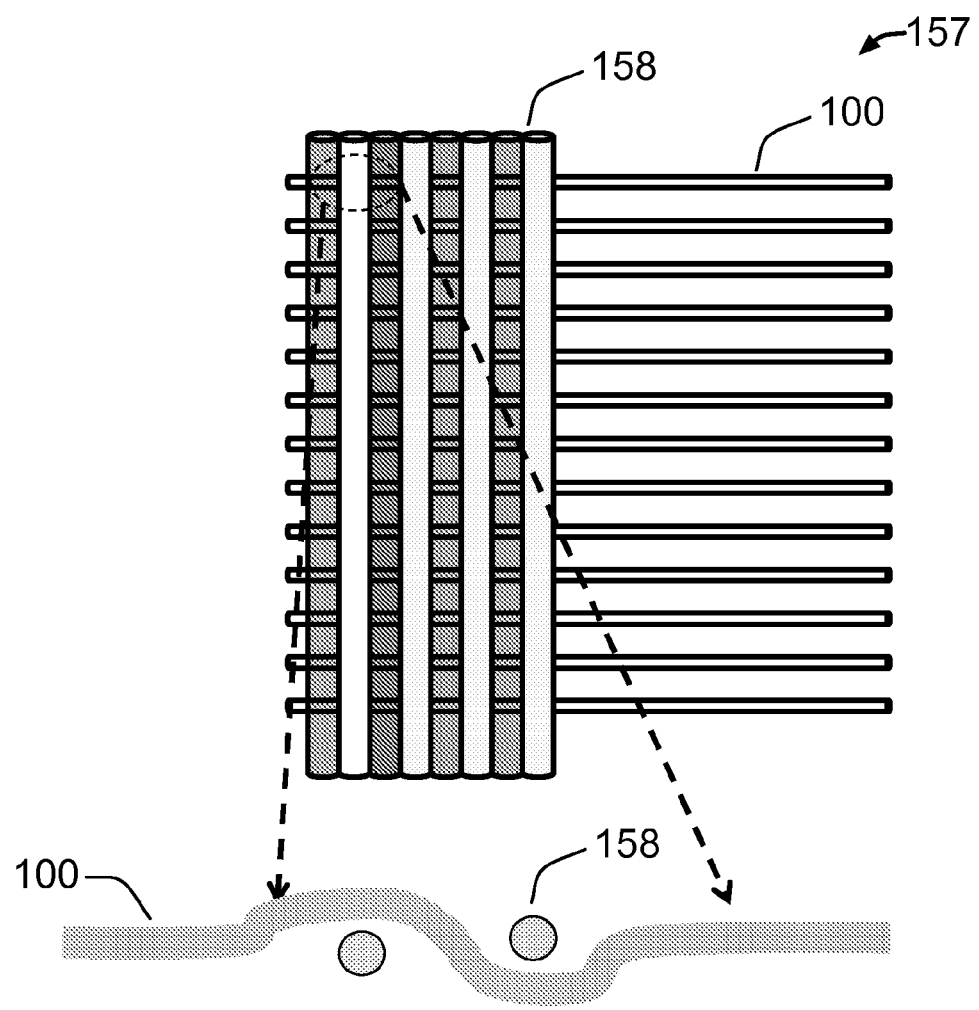
FIG. 15 is an illustration of optical fibers, in accordance with this invention, which are woven into a textile with textile fibers, which offer zero or low micro-bending at the intersection.
Figure 16:
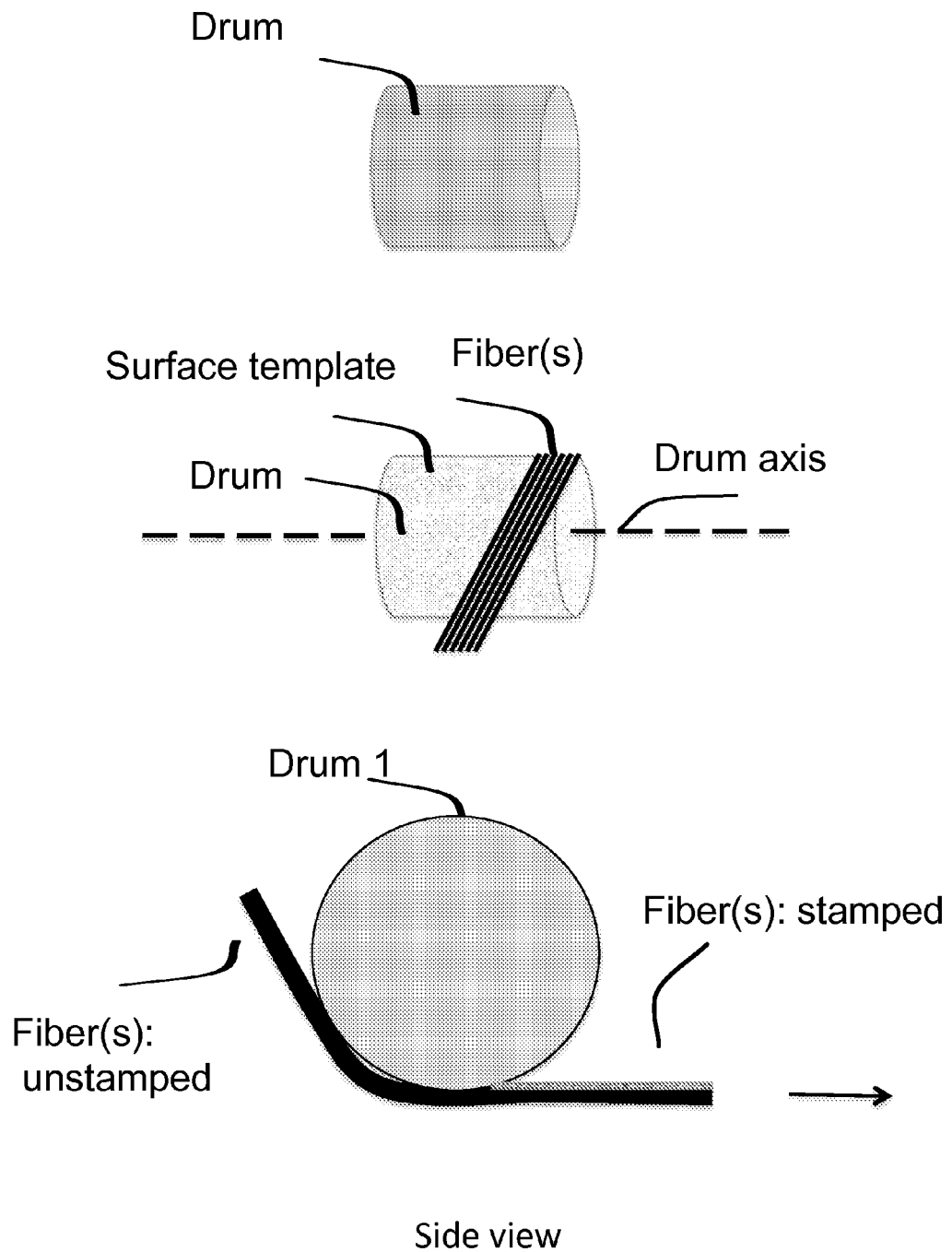
FIG. 16 is an illustration of an exemplary fiber spooling process comprising one drum.
Figure 17:
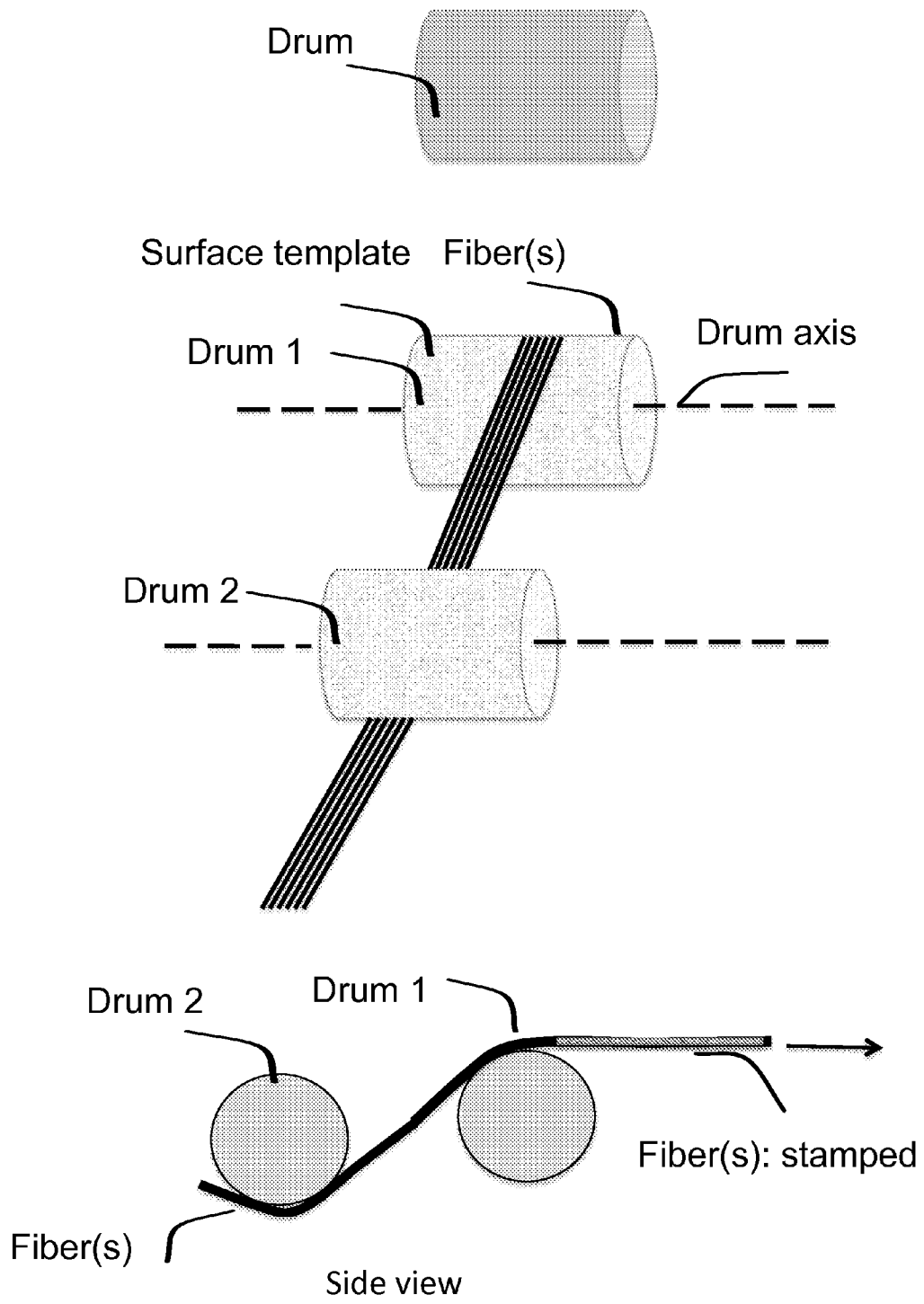
FIG. 17 is an illustration of an exemplary fiber spooling process comprising two drums.

FIG. 12 is an illustration of examples of optical fibers arranged into an array, a layer and a bundle. FIG. 14-15 are illustrations of a cloth, or a textile comprising optical fibers (100) with Surface Light Field Emulation segment (herein after "s-LiFE optical fibers") in the present invention. FIG. 13 shows a prior art example (152) wherein the unmodified optical fiber (98) relies on micro-bending (154) to achieve side emission. The unmodified optical fiber (98) not only has to be woven but also the bending angles (156) have to be significant to allow noteworthy emission through its side. Only one bending angle is shown for clarification purpose in FIG. 13. Comparing to what is depicted in FIG. 13, because the side emission of s-LiFE optical fibers (100) is not relied on micro-bending, it is not necessary for s-LiFE optical fibers (100) to be woven to obtain an emissive textile or cloth. s-LiFE optical fibers (100) in the present invention can be turned into a seamless textile (shown in FIG. 14) or being mixed with very light weight fibers (158) such as silk (shown in FIG. 15). In the seamless textile (155), the bending angles between the fibers are essentially zero. And in the cloth of mixed fibers (157), the bending angles between the s-LiFE optical fibers (100) and light weight fibers (158) are substantially smaller than the bending angles in FIG. 13 and the micro-bending is kept at the minimum.

In summary, the s-LiFE optical fibers are more flexible and conformable, than unmodified optical fibers, to other fibers that are mixed together. Therefore the s-LiFE optical fibers in the present invention are more easily and readily adaptable to other commercial fibers in the textile industry.

Types of applications for such an illumination system comprising the said Surface Light Field Emulation (s-LiFE) optical fibers are included below.

Systems comprising s-LiFE optical fibers of the present invention can be used both as illumination and decorative lighting. Illumination lighting herein is referred as the lighting installed to achieve practical effect such as brightness, whereas decorative lighting herein is referred as lighting with specific features for appealing aesthetic purposes. Both illumination lighting and decorative lighting include usage of all the light coupling from interior of the optical fiber to the exterior environment, through refraction, reflection, deflection and light energy transfer through dye emitting. The light escapes through the length of the optical fibers is called side coupling. The light coming out from the end of optical fiber is called end coupling. Some applications use more side coupling than the end coupling, but some applications prefer more end coupling than side coupling. Still some uses require approximately equal amount of side and end coupling. The illustrative applications herein utilize the more side coupling than end coupling, wherein in some examples, end coupling is minimized according to the desired application. But the illustrative applications are not to be used to limit the scope of s-LiFE optical fiber systems.

The illumination system comprising optical fibers in this invention are useful for specialty lighting. The current invention can be easily arranged into a surface illumination to light up an area where for current technology using LEDs or fluorescent light bulbs have to use diffuser to achieve evenly distributed brightness. This application is particularly useful where extra space is desired, like illuminated shelves in the supermarkets, lighting for kitchen counter tops, in the cabinets, or instrument panels in cars etc.

Because the articles of the current invention are elongated, flexible and capable of providing continuous lighting in a specific desired area, the current invention can be used as part of medical illumination or radiation apparatus. Specifically, a light guide is constructed comprising a bundle of optical fibers comprising Surface Light Field Emulation (s-LiFE) segment in this invention, wherein the Surface Light Field Emulation (s-LiFE™) segment can conform to specific curvatures of disease areas or intend to radiate areas. The intensity of light comes out through the Surface Light Field Emulation (s-LiFE™) segment is more than that exits from the end. The disadvantage of existing end-emitting optical fibers is that they only deliver a high intensity point radiation to the disease area, but the intended area to be irradiated is often not just a point. Most importantly, using a point light, the therapeutic results are very sensitive to the position and angle of the optical fiber, making the results very difficult to re-produce. The apparatus in this invention is able to provide conformable, evenly distributed radiation with reduced intensity. This improves the repeatability of the therapeutic procedure and reduces unintended damage.

Another embodiment of this invention is emitting upholstery materials containing the optical fibers herein and used in interior illumination of vehicles, houses, and airplanes. Specifically, a light emitting floor mat or upholstery in the trunk of a car comprises Surface Light Field Emulation (s-LiFE™) optical fibers in this invention, woven or stitched or attached or embedded into the fabric or upholstery. A device can modulate the color and brightness of such fabric and upholstery.

Further, sportswear, including both shoes and clothing, comprising the said emitting fabric, having optionally reflective materials, provides active illumination and better protection for the wearer.

Self-illuminated pet products, including pet leashes, pet wear, pet collars, comprises Surface Light Field Emulation (s-LiFE™) optical fiber in this invention and reflective materials and Nylon or other appropriate polymers with significant tensile strength. The said self-illuminated pet products provide visibility from 25-50 feet from vehicle headlights.

Still other illumination systems can use the current invention to achieve a combination of safety and decorative purposes. Such systems include illuminating fish line, glowing hair, peripheral illumination for spa or a pool, holiday decorations such as glowing twig trees.

Experimental

A representative experiment is illustrated below.

Material

The plastic optical fiber (POF) used in this experiment has a core with refractive index of 1.49 and the cladding has a refractive index of around 1.46. In this optical fiber, the optical transmission in the core was optimized for 800 nm light, thus the visible light with wavelength from 560-780 nm has a slightly higher cladding mode than the guided mode. The optical fiber used in this experiment has a core diameter of 250 micrometers while the cladding is around 2.5 micrometers.

Process

The Nanoscale geometric patterns are processed through the following steps:
1. A template with a randomized pattern was created using a holographic method. This randomized pattern consists of various periodic structures, each with various periods and modulation depth. All these periodic structures were then superimposed onto the final template using the holographic method. The resulting geometric pattern exhibited a random pattern that serves as a scattering center.
2. The template was positioned on a drum that is carrying the POF under treatment.
3. POF under treatment was first passed through heat (air heat) to increase its surface temperature to ~65° C.
4. Then the POF was run through the drum with the template on the surface.
5. The drum was being applied with constant pressure with a preset spring load device, which pressed the POF onto the drum surface.
6. This template was then transferred to the surface of the POF through this process.
7. Several POF segments with s-LiFE™ modification were then bundled together to form an emitting string.
8. The end of the emitting string was coupled to a LED light that was powered by battery.
9. An LED light was coupled through both ends of the string and propagated along the core and cladding of the POF.

Light was coupled out of the optical fiber in the s-LiFE™ segment into air throughout the length of POF. Current s-LiFE™ emission recited in this experiment occurred on the cladding/air interface and radiated toward the outside of the optical fiber. Because each s-LiFE™ emission was engineered into a very tiny area, the light output intensity was significantly increased appearing as an emission effect similar to a conventional sparking effect. In addition, the emission angles were further adjusted over a wide range together with modulation of the light source, a LED light in this example, a more desirable finish effect was created with a variety of color and brightness options.

We claim:

1. A method for making a modified optical fiber comprises a fiber spooling process, comprising:
   a) providing a template or mold with mirror image topography on a surface resembling a desired result topography of the modified optical fiber, wherein at least one optical fiber has a Tg;
   c) positioning the modified optical fiber circumferentially around the at least a first drum, wherein the modified optical fiber can completely surround a circumferential surface of the first drum or only make physical contact with a portion of circumferential surface of the first drum;
   d) spooling the modified optical fiber along a spooling system comprising at least the first drum by rotating the first drum;
   e) increasing a surface temperature of the modified optical fiber;
   f) pressing the modified optical fiber against the template or mold by pulling the modified optical fiber through the spooling system which provides tension on the modified optical fiber;
   g) transferring the mirror image topography to the modified optical fiber to form the desired result topography;
   h) allowing the modified optical fiber to cool; and
   i) releasing the template or mold from the modified optical fiber.

2. The method of claim 1, wherein the modified optical fiber comprises a core and a cladding, and the Tg of the modified optical fiber is the Tg of the cladding.

3. The method of claim 1, wherein the mirror image topography of the template comprises repeated nanostructures.

4. The method of claim 1, wherein the template is part of the first drum.

5. The method of claim 1, wherein the template or mold is fabricated to the drum surface.

6. The method of claim 1, wherein the step c) further comprises
   maintaining tension on the modified optical fiber by applying constant pressure from both ends of the fiber to hold optical fiber straight.

7. The method of claim 1, wherein the step d) further comprises spooling the modified optical fiber along the first drum in the direction parallel to the length of the modified optical fiber; keeping the modified optical fiber straight along the pulling direction by applying proper tension on the modified optical fiber; and controlling the pulling speed by rotation of the first drum.

8. The method of claim 1, wherein the step of increasing a surface temperature of the modified optical fiber further comprise passing a heat medium through the modified optical fiber.

9. The method of claim 1, wherein the step of increasing the surface temperature of the optical fiber further comprise
applying heat source to increase the surface temperature of the first drum.

10. The method of claim 1, wherein the step f) further comprises
adjusting the pulling speed to allow contact time between the first drum and the modified optical fiber during the pulling process.

11. The method of claim 1, wherein the step g) further comprise
rotating the template or mold to press onto >80% surface area of the modified optical fiber.

12. The method of claim 1, wherein the modified optical fiber is arranged in a fiber array.

13. The method of claim 1, wherein optical fiber comprises a coating, and the coating has a Tg.

14. The method of claim 3, wherein each of the nanostructures comprises a peak and a valley.

15. The method of claim 1, wherein the desired result topography of the optical fibers comprise physical geometric patterns.

16. The method of claim 3, wherein the average roughness of the repeated nanostructures is in the range of 8 nm-2000 nanometers.

17. The method of claim 14, wherein the distance between the peak and its nearest peak in the repeated nanostructures are in the range of 30 nm-1200 nanometers.

18. The method of claim 1, wherein the spooling system further comprise a second drum.

19. The method of claim 18, further comprising
synchronizing the rotational speed of the second drum with the first drum.

* * * * *